United States Patent [19]
Yamaguchi et al.

[11] Patent Number: 6,123,911
[45] Date of Patent: Sep. 26, 2000

[54] PROCESS FOR PREPARING LITHIUM MANGANATE FOR LITHIUM SECONDARY BATTERY

[75] Inventors: Munetoshi Yamaguchi; Koichi Numata, both of Takehara, Japan

[73] Assignee: Mitsui Mining & Smelting Company, Ltd., Tokyo, Japan

[21] Appl. No.: 09/150,188

[22] Filed: Sep. 10, 1998

[30] Foreign Application Priority Data

Feb. 12, 1998 [JP] Japan .................................. 10-029486
Apr. 7, 1998 [JP] Japan .................................. 10-094159

[51] Int. Cl.[7] .............................. C01G 45/02; H01M 4/50
[52] U.S. Cl. .......................... 423/599; 423/605; 429/224
[58] Field of Search .................................. 423/599, 605, 423/179.5; 429/224

[56] References Cited

U.S. PATENT DOCUMENTS

| | | | |
|---|---|---|---|
| 4,959,282 | 9/1990 | Dahn et al. .............................. | 429/224 |
| 5,240,794 | 8/1993 | Thackeray et al. ...................... | 429/224 |
| 5,266,299 | 11/1993 | Tarascon ................................. | 423/599 |
| 5,370,949 | 12/1994 | Davidson et al. ....................... | 429/224 |
| 5,506,078 | 4/1996 | Davidson et al. ....................... | 429/224 |
| 5,648,057 | 7/1997 | Ueda et al. .............................. | 423/594 |
| 5,677,087 | 10/1997 | Amine et al. ........................... | 429/224 |
| 5,702,679 | 12/1997 | Sheargold et al. ...................... | 423/599 |
| 5,716,737 | 2/1998 | Hasegawa et al. ..................... | 429/224 |
| 5,718,877 | 2/1998 | Manev et al. ........................... | 423/599 |
| 5,742,070 | 4/1998 | Hayashi et al. ....................... | 252/182.1 |
| 5,759,510 | 6/1998 | Pillai ....................................... | 423/599 |
| 5,874,058 | 2/1999 | Sheargold et al. ...................... | 423/599 |

*Primary Examiner*—Steven P. Griffin
*Assistant Examiner*—Cam N. Nguyen
*Attorney, Agent, or Firm*—Young & Thompson

[57] ABSTRACT

A process for producing a lithium manganate for lithium secondary batteries comprising mixing a manganese compound and a lithium compound, firing the mixture at 1000 to 1500° C., mixing the resulting complex oxide with a lithium compound, and firing the mixture at 600 to 800° C.

2 Claims, No Drawings

PROCESS FOR PREPARING LITHIUM MANGANATE FOR LITHIUM SECONDARY BATTERY

BACKGROUND OF THE INVENTION

Field of the Invention

The present invention relates to a process for preparing a cathode active material for a lithium secondary battery. More particularly, it relates to a process for preparing a cathode active material for providing lithium secondary batteries which has excellent packing properties and provides a lithium secondary battery having a high capacity and satisfactory high-temperature characteristics and preferred as a driving power source.

With the recent rapid development of portable and wireless electronic equipment such as personal computers and telephones, the demand for secondary batteries as a driving power source has been increasing. In particular lithium secondary batteries are expected for their smallest size and high energy density. Cathode active materials for lithium secondary batteries meeting the demand include lithium cobaltate ($LiCoO_2$), lithium nickelate ($LiNiO_2$), and lithium manganate ($LiMn_2O_4$). Having an electrode potential of 4 V or higher with respect to lithium, these lithium complex oxides provide lithium secondary batteries having a high energy density.

Compared with $LiNiO_2$ and $LiCoO_2$ having a theoretical capacity of about 280 mAh/g, $Li_2O_4$ has a theoretical capacity as low as 148 mAh/g but is deemed suited for use in electric vehicles because of an abundant and inexpensive supply of manganese oxide as a raw material and freedom from such thermal instability in charging as observed with $LiNiO_2$.

There is a problem that lithium secondary batteries using these Li-Mn complex oxides as a cathode active material are inferior in high-temperature characteristics to those using conventional $LiCoO_2$ or $LiNiO_2$ as a cathode active material.

Displacement of part of manganese with lithium or a transition element has been attempted as a countermeasure, which brings about improvement to some extent but is still insufficient.

The problem of the small battery capacity is also outstanding.

SUMMARY OF THE INVENTION

An object of the present invention is to provide a process for producing a cathode active material for lithium secondary batteries which has excellent packing properties and provides a lithium secondary battery having a high capacity and satisfactory high-temperature characteristics and preferred as a driving power source.

As a result of studies, the inventors have also found that the above object is achieved by mixing a manganese compound and a lithium compound, firing the mixture at a constant temperature (first firing), mixing the resulting complex oxide with a lithium compound, and firing the mixture at a constant temperature (second firing).

Thus, the present invention provides a process for producing a cathode active material for lithium secondary batteries comprising mixing a manganese compound and a lithium compound, firing the mixture at 1000 to 1500° C. (first firing), mixing the resulting complex oxide with a lithium compound, and firing the mixture at 600 to 800° C. (second firing).

According to the present invention, there is obtained a cathode active material for lithium secondary batteries which has excellent packing properties and provides a lithium secondary battery having a high capacity and satisfactory high-temperature characteristics and preferred as a driving power source.

DETAILED DESCRIPTION OF THE INVENTION

In the present invention, a mixture of a manganese compound and a lithium compound is subjected to first firing at 1000 to 1500° C., and the resulting complex oxide is mixed with a lithium compound and subjected to second firing at 600 to 800° C.

The first firing temperature is limited within the range of from 1000 to 1500° C. for the following reasons. If it is lower than 1000° C., the resulting cathode active material has a reduced tapping density and a reduced capacity retention at 60° C. If it exceeds 1500° C., sublimation of lithium takes place, and the battery characteristics at 20° C. and 60° C. are deteriorated.

The reasons for setting the second firing temperature within a range of from 600 to 800° C. are as follows. If the second firing temperature is lower than 600° C., the reaction between the complex oxide and the lithium compound is insufficient, and battery characteristics at 20° C. and 60° C. are deteriorated. If it is higher than 800° C., the resulting complex oxide undergoes decomposition, and battery characteristics at 20° C. and 60° C. are deteriorated.

In carrying out the first and second firing, known furnaces, such as a rotary kiln and a stationary furnace, can be used.

It is particularly preferable that the first firing is carried out in a rotary kiln with its uniform temperature zone being set at 1000 to 1500° C. while feeding the raw material mixture from the upper part of the furnace tube and discharging the reaction product (complex oxide) from the lower part of the furnace tube and that the second firing is carried out by the use of a stationary furnace.

The rate of temperature rise and drop is 300° C./min or higher in using a rotary kiln and 1 to 5° C./min in using a stationary furnace.

In the lithium secondary battery using the resulting complex oxide as a cathode active material, the other particulars are not limited as long as metallic lithium or a substance capable of intercalating and deintercalating lithium is used as an anode material. For example, useful electrolytes include a solution of a lithium salt in an organic solvent, such as carbonates, sulfolanes, lactones, and ethers; and lithium ion-conducting solid electrolytes.

The present invention will now be illustrated in greater detail with reference to Examples.

EXAMPLE 1

Twenty grams of lithium carbonate and 100 g of manganese dioxide were weighed (Li:Mn atomic ratio=1:2) and mixed in a ball mill, and the mixture was fired in an electric furnace at 1050° C. (first firing). The fired product was crushed to obtain an Li-Mn complex oxide.

A hundred grams of the Li-Mn complex oxide and 3.6 g of lithium carbonate were weighted out (Li:Mn atomic ratio=1.10:1.90) and mixed in a ball mill. The mixture was fired in an electric furnace at 650° C. (second firing) and crushed to obtain an Li-Mn complex oxide.

The tapping density of the Li-Mn complex oxide was measured. A coin battery was assembled by using the resulting Li-Mn complex oxide as a cathode active material and subjected to a discharge test to measure the initial discharge capacity (mAh/g) at 20° C. and the capacity retention (%) at the 15th charge and discharge cycle at 20° C. and 60° C. The results obtained are shown in Table 1.

EXAMPLE 2

The procedure of Example 1 was repeated, except that the temperature of the first firing (manganese dioxide+lithium carbonate) was changed to 1000° C.

EXAMPLE 3

The procedure of Example 1 was repeated, except that the temperature of the first firing (manganese dioxide+lithium carbonate) was changed to 1100° C.

EXAMPLE 4

The procedure of Example 1 was repeated, except that the temperature of the first firing (manganese dioxide+lithium carbonate) was changed to 1500° C.

EXAMPLE 5

The procedure of Example 1 was repeated, except that the temperature of the second firing (Li-Mn complex oxide+lithium carbonate) was changed to 600° C.

EXAMPLE 6

The procedure of Example 1 was repeated, except that the temperature of the second firing (Li-Mn complex oxide+lithium carbonate) was changed to 800° C.

COMPARATIVE EXAMPLE 1

The procedure of Example 1 was repeated, except that the temperature of the first firing (manganese dioxide+lithium carbonate) was changed to 900° C.

COMPARATIVE EXAMPLE 2

The procedure of Example 1 was repeated, except that the temperature of the first firing (manganese dioxide+lithium carbonate) was changed to 1600° C.

COMPARATIVE EXAMPLE 3

The procedure of Example 1 was repeated, except that the temperature of the second firing (Li-Mn complex oxide+lithium carbonate) was changed to 500° C.

COMPARATIVE EXAMPLE 4

The procedure of Example 1 was repeated, except that the temperature of the second firing (Li-Mn complex oxide+lithium carbonate) was changed to 900° C.

The Li-Mn complex oxides obtained in Examples 1 to 5 and Comparative Examples 1 to 4 were tested in the same manner as in Example 1 to measure the tapping density, the initial discharge capacity (mAh/g) at 20° C., and the capacity retention (%) at the 15th charge and discharge cycle at 20° C. and 60° C. The results obtained are shown in Table 1.

TABLE 1

| | Firing Temp. (° C.) | | Tapping Density | Discharge Capacity (20° C.) | Capacity Retention (%) | |
| --- | --- | --- | --- | --- | --- | --- |
| | 1st | 2nd | (g/ml) | (mAh/g) | 20° C. | 60° C. |
| Example 1 | 1050 | 650 | 2.00 | 110 | 99.0 | 90.0 |
| Example 2 | 1000 | 650 | 1.96 | 113 | 99.2 | 90.2 |
| Example 3 | 1100 | 650 | 2.00 | 109 | 99.3 | 90.0 |
| Example 4 | 1500 | 650 | 2.05 | 108 | 99.5 | 89.5 |
| Example 5 | 1050 | 600 | 2.00 | 111 | 99.2 | 90.3 |
| Example 6 | 1050 | 800 | 2.05 | 110 | 99.0 | 90.1 |
| Compara. Example 1 | 900 | 650 | 1.75 | 110 | 99.0 | 80.0 |
| Compara. Example 2 | 1600 | 650 | 2.00 | 90 | 85.0 | 60.0 |
| Compara. Example 3 | 1050 | 500 | 2.00 | 90 | 86.0 | 62.0 |
| Compara. Example 4 | 1050 | 900 | 2.00 | 92 | 88.0 | 65.0 |

The results in Table 1 provide confirmation that the Li-Mn complex oxides of Examples 1 to 6 have a high tapping density, indicating excellent packing properties, and the secondary batteries using them as a cathode active material exhibit satisfactory characteristics as a driving power source in terms of discharge capacity at 20° C. and capacity retention at 20° C. and 60° C.

In the following Examples, the influence of a firing apparatus, i.e., a rotary kiln or a stationary furnace, used in the first firing and second firing was confirmed.

EXAMPLE 7

Lithium carbonate (2 kg) and manganese dioxide (10 kg) were weighed (Li:Mn atomic ratio=1:2) and mixed in a ball mill, and the mixture was fired in a rotary kiln at 1050° C. (first firing). The fired product was crushed to obtain an Li-Mn complex oxide.

The-resulting Li-Mn complex oxide (10 kg) and lithium carbonate (0.36 kg) were weighted out (Li:Mn atomic ratio= 1.10:1.90) and mixed in a ball mill. The mixture was fired in a stationary furnace at 650° C. (second firing) and crushed to obtain an Li-Mn complex oxide.

A coin battery was assembled by using the resulting Li-Mn complex oxide as a cathode active material and subjected to a discharge test.

EXAMPLE 8

The procedure of Example 7 was repeated, except that the first firing was carried out in a stationary furnace.

The Li-Mn complex oxides obtained in Examples 7 to 8 were tested in the same manner as in Example 1 to measure the tapping density, the initial discharge capacity (mAh/g) at 20° C., and the capacity retention (%) at the 15th charge and discharge cycle at 20° C. and 60° C. The results obtained are shown in Table 2.

TABLE 2

| | Firing Apparatus | | Tapping Density | Discharge Capacity (20° C.) | Capacity Retention (%) | |
|---|---|---|---|---|---|---|
| | 1st (1050° C.) | 2nd (650° C.) | (g/ml) | (mAh/g) | 20° C. | 60° C. |
| Example 7 | rotary kiln | Stationary furnace | 2.00 | 110 | 99.0 | 90.0 |
| Example 8 | Stationary furnace | Stationary furnace | 1.96 | 113 | 95.0 | 75.0 |

What is claimed is:

1. A process for producing lithium manganate for lithium secondary batteries, comprising mixing manganese dioxide and lithium carbonate, firing the mixture at 1000–1500° C., mixing the resulting lithium-manganese complex oxide with additional lithium carbonate, and firing the latter mixture at a temperature of 600–800° C.

2. A process according to claim 1, wherein the first firing is carried out in a rotary kiln, and the second firing is carried out in a stationary furnace.

* * * * *